United States Patent
Akilandeswari Venkat (10) Patent No.: US 12,101,635 B2
(45) Date of Patent: Sep. 24, 2024

(54) ACCESS POINT CAPABLE OF MIRRORING WIRED AND WIRELESS DATA TRAFFIC

(71) Applicant: Hewlett Packard Enterprise Development LP, Houston, TX (US)

(72) Inventor: Vinod Kumaar Akilandeswari Venkat, San Jose, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 359 days.

(21) Appl. No.: 17/806,867

(22) Filed: Jun. 14, 2022

(65) Prior Publication Data
US 2023/0403561 A1    Dec. 14, 2023

(51) Int. Cl.
*H04W 12/121* (2021.01)
*H04W 12/037* (2021.01)
*H04W 12/06* (2021.01)

(52) U.S. Cl.
CPC ....... *H04W 12/121* (2021.01); *H04W 12/037* (2021.01); *H04W 12/06* (2013.01)

(58) Field of Classification Search
CPC .. H04W 12/121; H04W 12/037; H04W 12/06
See application file for complete search history.

(56) References Cited

U.S. PATENT DOCUMENTS 8,018,834 B2 * 9/2011 Mantysalo .......... H04M 1/6066
370/210
9,107,027 B2 * 8/2015 Sudak ................... G06F 1/1698
10,419,280 B2 * 9/2019 Liu ...................... H04L 41/0803
11,032,735 B2 * 6/2021 Stawiarski ........ H04W 28/0284
11,249,688 B2 2/2022 Foo
11,805,009 B2 * 10/2023 Travostino .............. H04L 41/22
(Continued)

FOREIGN PATENT DOCUMENTS

| CN | 106687911 A * | 5/2017 | ........... G06F 3/0607 |
| CN | 110635891 A * | 12/2019 | ............... H04B 1/40 |

(Continued)

OTHER PUBLICATIONS

Koubaa et al., "Z-Monitor: Monitoring and Analyzing IEEE 802.15.4-based Wireless Sensor Networks", IEEE 36th Conference on Local Computer Networks, 2011, 9 pages.

(Continued)

*Primary Examiner* — Adam D Houston
(74) *Attorney, Agent, or Firm* — Hewlett Packard Enterprise Patent Department (57) ABSTRACT

Examples described herein relate to an access point (AP) capable of simultaneously capturing both wireless data traffic and wired data traffic and mirroring the captured data traffic to a communication port on the AP. The AP includes a data mirroring circuit to capture the wireless data traffic and/or wired data traffic and mirror the captured data traffic to the communication port so that the captured data is transferred to an external device (e.g., a USB flash drive) connected to the communication port. In some examples, to enable the capturing and mirroring of the data traffic, the AP includes a receiver and a transmitter. The receiver captures the wireless data traffic and the wired data traffic transmitted and received by a data processing circuit of the AP, and the transmitter transmits the captured data traffic to the communication port to store the captured data traffic in the external device.

20 Claims, 5 Drawing Sheets

(56) References Cited

U.S. PATENT DOCUMENTS

| | | | | |
|---|---|---|---|---|
| 2011/0167461 | A1* | 7/2011 | Maruyama | H04L 12/2838 |
| | | | | 725/81 |
| 2011/0171903 | A1* | 7/2011 | Toebes | H04W 76/10 |
| | | | | 455/14 |
| 2012/0170558 | A1* | 7/2012 | Forbes | H04W 88/08 |
| | | | | 370/338 |
| 2015/0154082 | A1* | 6/2015 | Dasari | G06F 11/1666 |
| | | | | 711/162 |
| 2016/0119240 | A1* | 4/2016 | Ross | H04L 63/18 |
| | | | | 370/235 |
| 2020/0196191 | A1* | 6/2020 | Deparisse | H04L 43/0888 |
| 2021/0092620 | A1* | 3/2021 | Hsieh | H04W 48/16 |
| 2023/0403561 | A1* | 12/2023 | Akilandeswari Venkat | |
| | | | | H04W 12/06 |
| 2024/0163770 | A1* | 5/2024 | Thubert | H04W 40/12 |

FOREIGN PATENT DOCUMENTS

| | | | | |
|---|---|---|---|---|
| CN | 111615096 | A * | 9/2020 | |
| CN | 111970203 | A * | 11/2020 | |
| EP | 3051922 | A1 * | 8/2016 | H04W 84/045 |
| JP | 2010050902 | A * | 3/2010 | |
| JP | 2012-074871 | A | 4/2012 | |

OTHER PUBLICATIONS

Troya et al., "Vulnerability detection in 802.11i wireless networks through link layer analysis", IEEE Latin-America Conference on Communications (LATINCOM), 2014, 6 pages.

* cited by examiner

ACCESS POINT CAPABLE OF MIRRORING WIRED AND WIRELESS DATA TRAFFIC

BACKGROUND

Access points generally allow more than one type of network connection such as wired connections and wireless connections. Some client devices may connect to an access point (AP) via wireless connections established in accordance with techniques specified in 802.11 Specifications defined by the Institute of Electrical and Electronics Engineers (IEEE). Whereas certain devices, such as, network switches and wireless local area network (WLAN) controllers, can connect to the AP via wired media such as Ethernet cables. For security reasons and management of the AP, generally, data traffic communicated via the AP is analyzed from time to time to determine if the AP is safe from any network attack, for example.

BRIEF DESCRIPTION OF THE DRAWINGS

One or more examples in the present disclosure are described in detail with reference to the following Figures. The Figures are provided for purposes of illustration only and merely depict examples.

The Figures are not exhaustive and do not limit the present disclosure to the precise form disclosed.

DETAILED DESCRIPTION

Today, advances in wireless networking technologies drive technological improvements in other technologies and industries. For example, various industries rely on wireless networking technologies for the communication, storage, and delivery of data and services. In wireless networks, client devices wirelessly connect to a network through an AP. Increasing usage of wireless networking technologies, among other factors, creates various technological challenges in the field of wireless networking. The IEEE has issued various standard Specifications, such as the 802.11 Specifications (hereinafter referred to as IEEE 802.11 Specifications) to address various challenges in the field of wireless networking technologies. Access points (APs) deployed in the wireless networks generally allow more than one type of network connection such as wired connections and wireless connections. Some client devices may connect to the AP via wireless connections established in accordance with techniques specified in IEEE 802.11 Specifications. Whereas certain devices, such as, network switches and WLAN controllers, can connect to the AP via wired media such as Ethernet cables. The data traffic that the AP communicates over wireless connections is hereinafter referred to as wireless data traffic and the data traffic that the AP communicates over the wired connections is hereinafter referred to as wired data traffic.

For security reasons and management of the AP, generally, data traffic communicated via the AP is analyzed from time to time to determine if the AP is safe from any network attack, for example. However, there are no direct methods to simultaneously capture both wired data traffic and the wireless data traffic communicated via the AP.

A common technique to capture the wired data traffic includes capturing such data traffic via an uplink external network device such as a network switch. In such an implementation, the uplink external network device needs to be capable of port mirroring to capture wired data traffic. However, such a use of the uplink external network device capable of port mirroring does not allow simultaneous mirroring of both the wired and wireless data traffic. Moreover, the connection of such uplink external network device may occupy a network interface, for example, an Ethernet port of the AP merely to capture the data traffic.

Further, another common technique to capture wireless data traffic entails streaming the wireless data traffic to a dedicated computer connected to the AP via a wired connection. Again, as noted hereinabove, connecting the dedicated PC may occupy a network interface, for example, an Ethernet port of the AP merely to capture the wireless data traffic. Further, the streaming of the data traffic in this matter may cause data packets in the data traffic to be missed and/or misarranged. Such a missing and misarrangement of the data packets makes such a process unreliable for analyzing the data traffic. Furthermore, the streaming of the data traffic via the wired interface may also increase the bandwidth. Moreover, even this technique does not allow simultaneous mirroring of both the wired and wireless data traffic.

Yet another common technique of capturing the wireless data traffic entails over-the-air capturing of wireless data traffic via a wireless packet capture device (e.g., wireless adapter). To enable such over the air capture, the wireless packet capture device may be deployed in a wireless network of the AP and is configured to listen to the data traffic on a specific channel. A drawback of such over-the-air capturing is that the captured wireless data traffic is based on the location of the packet capture device instead of the location or positioning of the AP. Further, the packet capture device may not be able to capture wireless data traffic that the AP communicates channels other than the specific channel on which the packet capture device is configured. Furthermore, the packet capture device implemented in this technique cannot capture the wired data traffic of the AP.

In accordance with some examples, an AP capable of simultaneously capturing both wireless data traffic and wired data traffic and mirroring the captured data traffic to a communication port on the AP is presented. In particular, the proposed AP includes a wireless network interface through which the AP communicates with network devices using wireless communication techniques. Further, the AP also includes a wired network interface through which the AP communicates with network devices over a wired communication medium. Furthermore, the AP includes a data processing circuit coupled to the wireless network interface and the wired network interface. The data processing circuit is configured to transmit and receive wireless data traffic via the wireless network interface and wired data traffic via the wired network interface.

Further, in accordance with aspects of the present disclosure, the AP includes a communication port to which the AP mirrors both the wired and wireless data traffic. Examples of the communication port may include a Universal Serial Bus (USB) port and an RJ-45 port. In one example, the communication port may be a Type-C USB port. In particular, to enable such data mirroring via the AP itself, the AP includes a data mirroring circuit. The data mirroring circuit is coupled to the wireless network interface, the wired network interface, and the communication port. In particular, the data mirroring circuit of the AP is configured to capture wireless data traffic and/or wired data traffic and mirror the captured data traffic to the communication port so that the captured data is transferred to an external device (e.g., a USB flash drive or any other storage device) connected to the communication port. In some examples, to enable the capturing and mirroring of the data traffic, the AP includes a receiver and a transmitter. The receiver captures the wireless data traffic and the wired data traffic transmitted and received by the data processing circuit, and the transmitter transmits the captured data traffic to the communication port to store the wireless data traffic and the wired data traffic in the external device connected to the AP via the communication port.

Further, in some examples, the data mirroring circuit may include a storage device connected to the receiver. The storage device may be used to temporarily buffer the data traffic captured by the receiver. Accordingly, the transmitter can wait until the external device is connected to the communication port to transfer the captured data. In some examples, the storage device stores the wireless data traffic and the wired data traffic in separate files. Moreover, in some examples, the data mirroring circuit includes an authentication unit that stores a cryptographic key of the AP using which the storage device decrypts the data traffic stored therein before transmitting it to the communication port.

As will be appreciated, the proposed AP itself is capable of simultaneously capturing both wireless data traffic and wired data traffic and mirroring the captured data traffic to a communication port. In particular, no external packet capturing and mirroring device is required to perform this task resulting in cost savings on IT infrastructure requirements. Further, the proposed AP does not entail streaming data traffic to other wired network devices thereby minimizing or avoiding the chances of data packets being missed or misarranged. Also, avoiding the use of network communication ports (e.g., Ethernet ports) for packet mirroring reduces network bandwidth usage and allows the use of such unoccupied ports to connect to other network devices.

The following detailed description refers to the accompanying drawings. It is to be expressly understood that the drawings are for the purpose of illustration and description only. While several examples are described in this document, modifications, adaptations, and other implementations are possible. Accordingly, the following detailed description does not limit disclosed examples. Instead, the proper scope of the disclosed examples may be defined by the appended claims.

Figure 1:
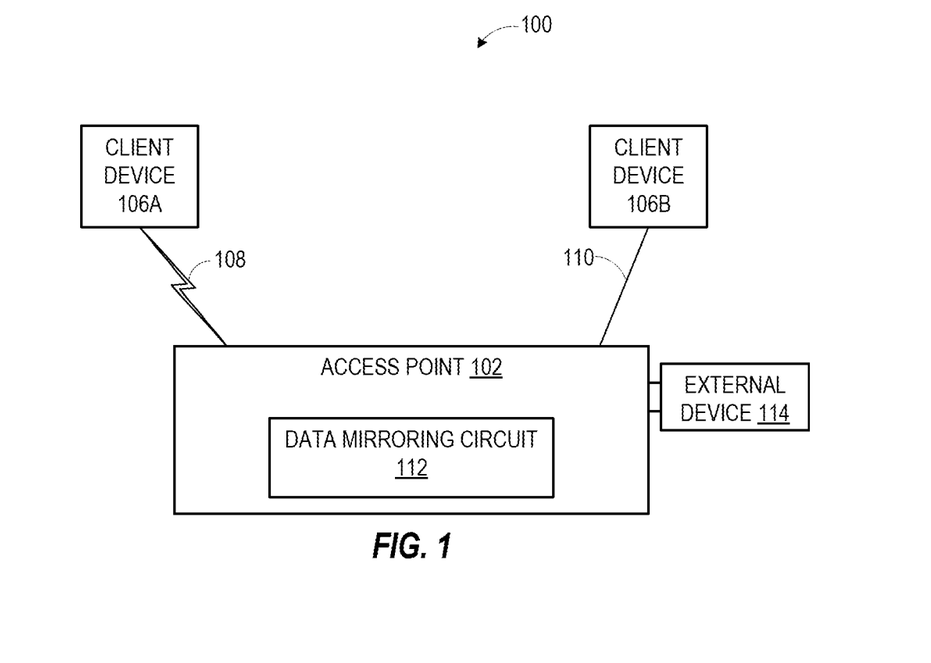
FIG. 1 depicts a system in which various of the examples presented herein may be implemented.

Before describing examples of the disclosed systems and methods in detail, it is useful to describe an example network installation with which these systems and methods might be implemented in various applications. FIG. 1 illustrates a system 100 in which various of the examples presented herein may be implemented. The system 100 may be implemented in any setup for example, in a home setup or an organization, such as a business, educational institution, governmental entity, healthcare facility, or other organization. The system 100 depicts a network of devices, such as, an AP 102 and one or more client devices, for example, client devices 106A and 106B. The system 100 may include a greater or fewer number of APs and the client devices than depicted in FIG. 1.

The client devices 106A and 106B may be electronic devices capable of communicating with an AP 102 or other electronic devices using wired or wireless communication media. Examples of client devices 106A and 106B may include desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smartphones, smart terminals, dumb terminals, virtual terminals, video game consoles, virtual assistants, Internet of Things (IoT) devices, and the like.

In the description hereinafter, the client device 106A is described as an electronic device that communicates with the AP 102 via a wireless communication link 108. The wireless communication link 108 may be a wireless communication link established between the AP 102 and the client device 106A according to the wireless communication protocols such as 802.11 Standards defined by the IEEE, Wi-Fi Alliance Specifications, or any other wireless communication standards. Any data traffic that is communicated (e.g., transmitted and/or received) by the AP 102 over such wireless communication link, for example, the wireless communication link 108, is hereinafter referred to as wireless data traffic.

Further, in the description hereinafter, the client device 106B is described as an electronic device that communicates with the AP 102 via a wired communication medium 110. In particular, in some examples, the client device 106B communicates with the AP 102 according to the Ethernet network protocols such as 802.3 Standards defined by IEEE, for example, or any other wired communication protocol/technique. In some examples, the client device 106B may also be a WLAN controller, a network switch, a router, a network gateway, or any other electronic device capable of communicating over a wired communication medium. Any data traffic that is communicated (e.g., transmitted and/or received) by the AP 102 over a wired communication medium, for example, the wired communication medium 110, is hereinafter referred to as wired data traffic.

The AP 102 may be a combination of hardware, software, and/or firmware that is configured to provide network connectivity to one or more of the client devices 106A, 106B. In some examples, the AP 102 may comprise, be implemented as, or known as a radio router, radio transceiver, a switch, a Wi-Fi hotspot device, Basic Service Set (BSS) device, Extended Service Set (ESS) device, radio base station (RBS), or some other terminology and may act as a point of network access for one or more of the client devices 106A, 106B. Although not shown, in some examples, the system 100 may include additional network devices such as, but not limited to, additional APs, WLAN controllers, network switches, gateway devices, routers, and the like. Via the AP 102, the client devices 106A, 106B may communicate with each other and/or with any other network device to which the AP 102 is communicatively connected (e.g., the network switches, the WLAN controller, and/or gateway devices).

In accordance with aspects of the present disclosure, the AP 102 includes a data mirroring circuit 112. The data mirroring circuit 112 may include several electronic components, for example, a receiver and a storage device, that allows the capture of data traffic (e.g., the wired and/or wireless data traffic) that is received by the AP 102 from the client devices 106A, 106B and/or transmitted by the AP 102 to the client devices 106A, 106B. In particular, in some examples, the data mirroring circuit 112 may be configured to capture both wired and/or wireless data traffic that is transmitted and/or received by the AP 102. The data mirroring circuit 112 may also include additional electronic circuitry that transmits the captured data to an external device, for example, an external device 114, upon detecting that the external device 114 is connected to the AP 102. Examples of the external device 114 may include a computer, a storage device, or any other compatible electronic device. The external device 114 may be connected to the AP at a communication port. Examples of the communication port may include a Universal Serial Bus (USB) port or a Registered Jack (RJ)-45 port. Certain additional details of an example data mirroring circuit are described in conjunction with an example AP depicted in FIG. 2.

Figure 2:
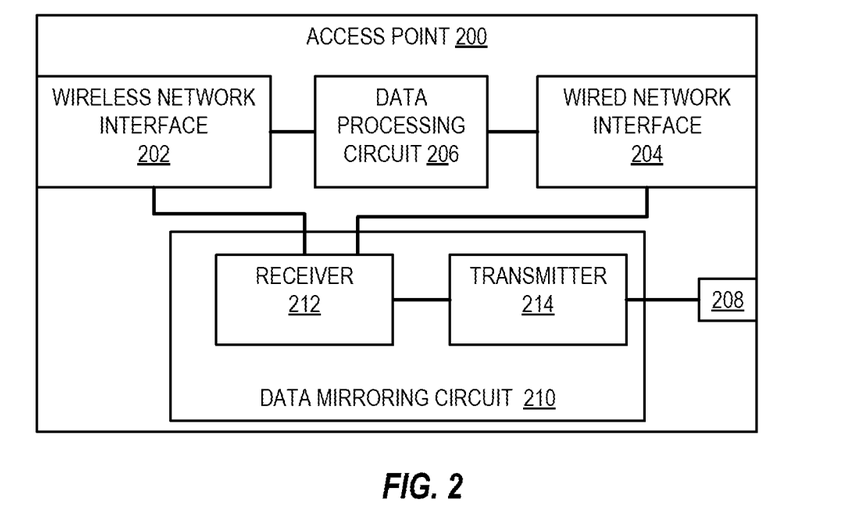
FIG. 2 depicts an example access point (AP) having a data mirroring circuit.

Turning now to FIG. 2, an example AP 200 is depicted. The AP 200 may be an example representative of the AP 102 shown in FIG. 1 and is capable of communicating with other network devices via wired and wireless communication media. In some examples, the AP 200 may be a combination of hardware, software, and/or firmware that is configured to provide network connectivity to one or more of the client devices that connect to the AP 200. In some examples, the AP 200 may include a wireless network interface 202, a wired network interface 204, a data processing circuit 206, a communication port 208, and a data mirroring circuit 210.

The AP 200 may communicate with network devices via the wireless network interface 202 and/or the wired network interface 204. In particular, the wireless network interface 202 allows the AP 200 to communicate with wireless network devices via wireless communication links operating on radio frequencies. The wireless network interface 202 may be implemented in the form of a wireless communication chip (e.g., a Wi-Fi chip) enabling data communication as per IEEE 802.11 Specifications. On the other hand, the wired network interface 204 allows the AP 200 to communicate with wired network devices via a wired communication medium (e.g., Ethernet cable). The wired network interface 204 may include electronic circuits to enable the AP 200 to communicate over the wired communication medium, for example, Ethernet cables. For example, such electronic circuits in the wired network interface 204 may be implemented in the form of a network card (e.g., Local Area Network (LAN) card) that is coupled to one or more LAN ports such as an Ethernet port. Wired network devices may connect to the AP 200 via the Ethernet port.

In some examples, the AP 200 may include a data processing circuit 206 that enables the AP 200 to communicate with client devices communicatively coupled to the AP 200. In particular, the data processing circuit 206 transmits and receives the wireless data traffic via the wireless network interface and the wired data traffic via the wired network interface. The data processing circuit 206 includes electronic circuitry that is configured to process data that is received by the AP 200 from the client devices and/or generate the data that is to be transmitted via the AP 200 to the client devices. In some examples, the electronic circuitry may include a processing resource and/or a machine-readable storage medium for the AP 200 to process, transmit, and/or receive data. The machine-readable storage medium may be encoded with executable instructions which when executed by the processing resource allows the processing resource to manage data communication with the client devices. Although not shown, in some examples, the machine-readable storage medium may be encoded with certain additional executable instructions to perform any other operations performed by the AP 200, without limiting the scope of the present disclosure.

The machine-readable storage medium may be any electronic, magnetic, optical, or any other storage device that may store data and/or executable instructions. Examples of the machine-readable storage medium that may be used in the AP 200 may include Random Access Memory (RAM), non-volatile RAM (NVRAM), an Electrically Erasable Programmable Read-Only Memory (EEPROM), a storage drive (e.g., a solid-state drive (SSD) or a hard disk drive (HDD)), a flash memory, and the like. The processing resource of the data processing circuit may be a physical device, for example, a central processing unit (CPU), a microprocessor, a graphics processing unit (GPU), a field-programmable gate array (FPGA), an application-specific integrated circuit (ASIC), other hardware devices capable of retrieving and executing instructions stored in the machine-readable storage medium, or combinations thereof. The processing resource may fetch, decode, and execute the instructions stored in the machine-readable storage medium to process, transmit, and/or receive data. As an alternative or in addition to executing the instructions, the processing resource may include at least one integrated circuit (IC), control logic, electronic circuits, or combinations thereof that include a number of electronic components for performing the functionalities intended to be performed by the AP 200.

Further, in some examples, the AP 200 may include a communication port 208 that may allow an external device (e.g., the external device 114 depicted in FIG. 1) to be connected to the AP 200. Examples of the communication port 208 may include a Universal Serial Bus (USB) port or a Registered Jack (RJ)-45 port. In particular, in one example, the communication port 208 may be a USB Type-C port. When the external device is connected to the communication port 208, the AP 200 may be configured to transfer data to the external device and/or receive data from the external device.

The data mirroring circuit 210 is coupled in parallel with the data processing circuit 206. In particular, the data mirroring circuit 210 is coupled to both the wireless network interface 202 and the wired network interface 204 to receive one or both of the wireless data traffic and the wired data traffic communicated through the AP 200. Further, the data mirroring circuit 210 is also coupled to the communication port 208. When an external device is connected to the communication port 208, the data mirroring circuit 210 may transmit the captured data to the external device via the communication port 208.

The data mirroring circuit 210 may include a receiver 212 and a transmitter 214. The receiver 212 may include electronic circuitry that is coupled to the wireless network interface 202 and the wired network interface 204 to receive both the wireless data traffic and the wired data traffic. In some examples, the receiver 212 may be implemented via a CPU, a microprocessor, a microcontroller, an FPGA, an ASIC, an IC, control logic, electronic circuits, or combinations thereof that include a number of electronic components for performing the functionalities intended to be performed by the receiver 212. Further, in some examples, the transmitter 214 may include electronic circuitry that is coupled to the receiver, directly or via intermediate electronic devices, to receive the data traffic captured via the receiver 212. In some examples, the transmitter 214 may be implemented via a CPU, a microprocessor, a microcontroller, an FPGA, an ASIC, an IC, control logic, electronic circuits, or combinations thereof that include a number of electronic components for performing the functionalities intended to be performed by the transmitter 214. In some examples, functionalities of the receiver 212 and the transmitter 214 may be implemented via a single device operating as both receiver and transmitter.

The transmitter 214 is coupled to the communication port 208 and configured to detect whether the external device is connected to the AP 200 at the communication port 208. When the transmitter 214 detects that the external device is connected at the communication port 208, the transmitter 214 may send a control signal, hereinafter referred to as, a data capture trigger, to the receiver 212. On receipt of the data capture trigger, the receiver 212 starts capturing one or both of the wireless data traffic and the wired data traffic that is communicated via the wireless network interface 202 and the wired network interface 204, respectively. In one example, the transmitter 214 may transmit the captured data traffic to the external device via the communication port 208. The data traffic transmitted via the communication port 208 may be stored in the external device.

Figure 3:
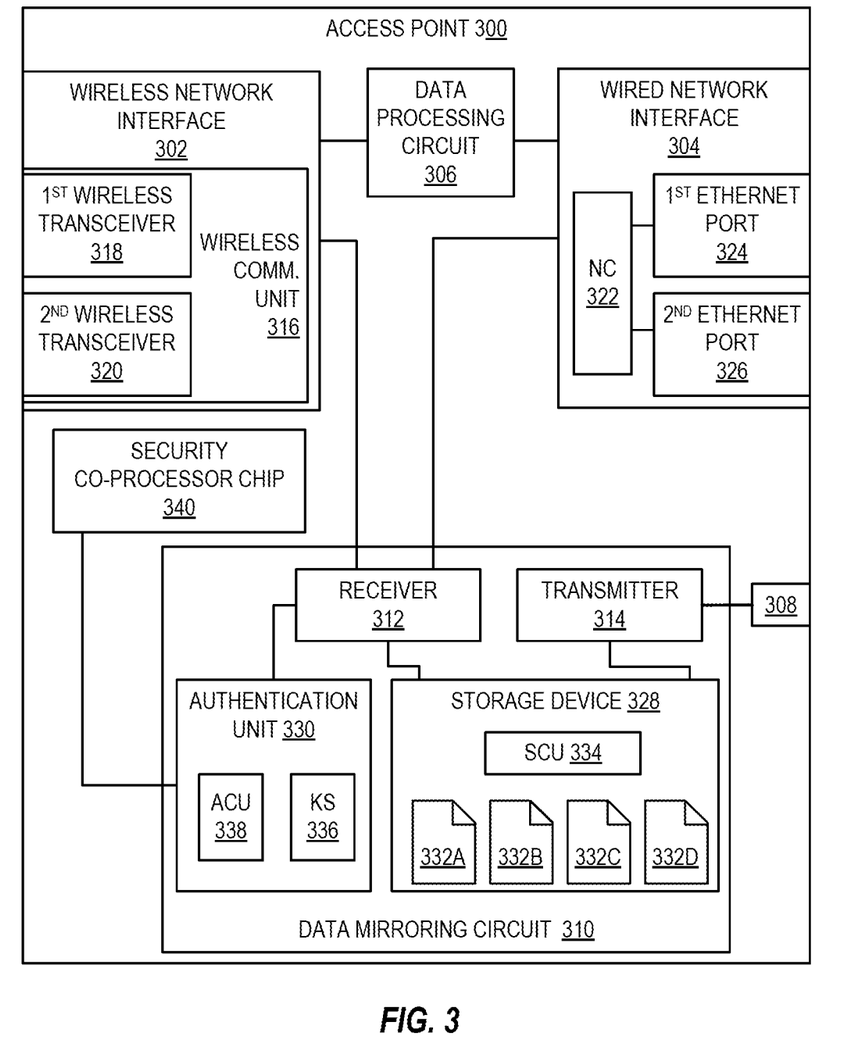
FIG. 3 depicts another example AP having a data mirroring circuit.

Turning now to FIG. 3, another example AP 300 capable of mirroring both wired data traffic and wireless data traffic is depicted. The AP 300 may be deployed in a network environment, for example, in the system 100 of FIG. 1 in place of the AP 102. The AP 300 may communicate wired data traffic and wireless data traffic with client devices and/or any other network device connected to the AP 300. The AP 300 of FIG. 3 is an example representative of the AP 102 of FIG. 1 and the AP 200 of FIG. 2 and includes certain components that are similar to those described in FIG. 2, the description of which is not repeated herein. For example, the AP may include a wireless network interface 302, a wired network interface 304, a data processing circuit 306, a communication port 308, and a data mirroring circuit 310 which are example representatives of the wireless network interface 202, the wired network interface 204, the data processing circuit 206, the communication port 208, and the data mirroring circuit 210 of FIG. 2.

The AP 300 may communicate with network devices via the wireless network interface 302 and/or the wired network interface 304. The wireless network interface 302 may include a wireless communication unit 316 implemented in the form of a wireless communication chip (e.g., a Wi-Fi chip) enabling data communication as per IEEE 802.11 Specifications. In particular, in some examples, the wireless communication unit 316 may include a plurality of transceivers, such as, a first wireless transceiver 318 and a wireless transceiver 320 operating at respective different radio frequency bands. By way of example, the first wireless transceiver 318 may operate at 2.4 GHz radiofrequency and the second wireless transceiver 320 may operate at 5 GHz radiofrequency. In some examples, the wireless communication unit 316 may also include a third wireless transceiver (not shown) that may operate at another radio frequency, for example, 6 GHz radiofrequency. Each transceiver 318, 320 may have a respective plurality of antennas to transmit and/or receive wireless data traffic. The AP 300 may establish multiple wireless communication channels via the transceivers 318, 320 using which AP 300 communicates with the client devices. Data traffic communicated via the wireless transceivers 318, 320 is referred to as wireless data traffic.

Further, in some examples, the wired network interface 304 allows the AP 300 to communicate with wired network devices via a wired communication medium (e.g., Ethernet cable). The wired network interface 304 may include electronic circuits to enable the AP 200 to communicate over the wired communication medium, for example, Ethernet cables. For example, such electronic circuits in the wired network interface 304 may be implemented in the form of a network card (e.g., Local Area Network (LAN) card) 322 that is coupled to one or more LAN ports, such as, a first Ethernet port 324 and a second Ethernet port 326. Wired network devices may connect to the AP 200 via the Ethernet ports 324, 326. Data traffic communicated via the Ethernet ports 324, 326 is referred to as wired data traffic. Further, in the description hereinafter, the wireless transceivers 318, 320, and the Ethernet ports 324, 326 are collectively referred to as communication interfaces of the AP 300.

The data processing circuit 306 enables the AP 300 to communicate with client devices that are communicatively coupled to the AP 300. The data processing circuit 306 includes electronic circuitry that is configured to process data traffic (e.g., the wireless data traffic and the wired data traffic) received by the AP 300 from the client devices and/or generate the data that is to be transmitted via the AP 300 to the client devices. Further, the communication port 308 may allow an external device (e.g., the external device 114 depicted in FIG. 1) to be connected to the AP 300. Examples of the communication port 308 may include a Universal Serial Bus (USB) port or a Registered Jack (RJ)-45 port. In particular, in one example, the communication port 308 may be a USB Type-C port.

The data mirroring circuit 310 is coupled in parallel with the data processing circuit 306. In particular, the data mirroring circuit 310 is coupled to both the wireless network interface 302 and the wired network interface 304 to receive one or both of the wireless data traffic and the wired data traffic when data capture is enabled on the AP 300. In some examples, the AP 300 supports data capture configuration via an AP configuration web portal or through a command-line interface (CLI). The configuration via CLI may be enabled through a WLAN controller or any other AP connected in the same network where the AP 300 is connected. Following example CLI commands may be defined to manage data mirroring via the AP 300.

```
#packet-capture-ap ap-name <AP name> enable USB
    All <period>                          CLI command (1)

#packet-capture-ap ap-name <AP name> enable USB
    Radio <0/1> <period>                  CLI command (2)

#packet-capture-ap ap-name <AP name> enable USB
    Eth <0/1> <period>                    CLI command (3)

#no packet-capture-ap ap-name <AP name>   CLI command (4)
```

The CLI commands 1, 2 and 3 may be executed to configure data mirroring requirements. The CLI command 4 may be executed to disable/stop data mirroring by the AP 300. In the CLI commands 1-3, the field <period> may be used to specify the duration in seconds (for example), hereinafter referred to as capture duration, for which data mirroring is enabled after the execution of the respective CLI command. Post the expiry of the duration set in the field <period>, the data mirroring circuit 310 may stop capturing data traffic. Further, the field <AP name>, in the CLI commands 1-4, may be used to specify the identity of the AP for which data mirroring is to be enabled. In some examples, the field <AP name> may is used to specify identity information such as a name, media access control (MAC) address, etc. that uniquely identifies the AP 300. The CLI command (1) may be executed to enable data mirroring via the communication port 308 (e.g., USB port) for the defined <period>. In particular, upon execution of the CLI command 1, the data mirroring circuit 310 captures data traffic via all communication interfaces (e.g., the wireless transceivers 318, 320, and Ethernet ports 324, 326).

The CLI command (2) may be executed to enable data mirroring via the communication port 308 (e.g., USB port) for the defined capture duration for a specified wireless transceiver. In particular, the field <0/1> followed by the term "Radio" indicates a particular wireless transceiver for which data capture is enabled. For example, a mention of "Radio 0" in the CLI command (2) may enable the capture of the wireless data traffic communicating through the first transceiver 318. Similarly, a mention of "Radio 1" in the CLI command (2) may enable, the capture of the wireless data traffic communicating through the second transceiver 320.

Further, the CLI command (3) may be executed to enable data mirroring via the communication port 308 (e.g., USB port) for the defined capture duration for the defined Ethernet port in the field <0/1>. In particular, the field <0/1> followed by the term "Eth" indicates a particular Ethernet port for which data capture is enabled. For example, a mention of "Eth 0" in the CLI command (3) may enable the capture of the wired data traffic communicating through the first Ethernet port 324. Similarly, a mention of "Eth 1" in the CLI command (3) may enable the capture of the wired data traffic communicating through the second Ethernet port 326.

The data mirroring circuit 310 is also coupled to the communication port 308. As noted earlier, the data mirroring circuit 310 may start capturing the wired data traffic and/or the wireless data traffic when the data capture is enabled, for example, upon execution of a respective CLI command. Further, when an external device is connected to the communication port 308, the data mirroring circuit 310 may transmit the captured data to the external device via the communication port 308. To enable such capture and transmission of the data traffic to the external device, the data mirroring circuit 310 may include a receiver 312, a transmitter 314, a storage device 328, and an authentication unit 330. Although the receiver 312, the transmitter 314, the storage device 328, and the authentication unit 330 are shown as separate units in the example implementation of FIG. 3, in some examples, these units may be combined into a single unit capable of performing respective operations. The receiver 312 and the transmitter 314 may be example representatives of the receiver 212 and the transmitter 214 described in FIG. 2 and may be implemented via a CPU, a microprocessor, a microcontroller, an FPGA, an ASIC, an IC, control logic, electronic circuits, or combinations thereof that include a number of electronic components.

The storage device 328 may be an electronic memory device that can store and/or process data (e.g., move, edit, delete, encryption, decryption, decapsulation, file management, etc.). The storage device 328 may be implemented using devices such as a RAM, an NVRAM, an EEPROM, a storage drive (e.g., SSD or HDD), a flash memory, and the like. In some examples, the storage device 328 may also include a storage control unit (SCU) 334 to control several memory processing operations on the storage device 328. The storage control unit 334 of the storage device 328 may be implemented via a CPU, a microprocessor, a microcontroller, an FPGA, an ASIC, an IC, control logic, electronic circuits, or combinations thereof. The storage device 328 is coupled to the receiver 312. The receiver 312 sends the captured data traffic to the storage device 328 which stores the data traffic.

In some examples, the storage device 328 is configured to store the wireless data traffic and the wired data traffic in separate files. In particular, in some examples, the storage control unit 334 parses each data traffic unit (e.g., a frame or a packet) that the storage device 328 receives from the receiver 312 to determine a communication interface through which the data traffic unit is communicated. In the example implementation of the AP 300 depicted in FIG. 3, the communication interface may be any of the first wireless transceiver 318, the second wireless transceiver 320, the first Ethernet port 324, or the second Ethernet port 326. The storage control unit 334 may create a file for each communication interface for which the data capture is enabled. Accordingly, for example, if full-data capture is enabled on the AP 300 (e.g., by executing the CLI command 1), the storage device 328 may create four files 332A, 332B, 332C, and 332D, hereinafter collectively referred to as files 332A-332D. In some examples, the files 332A, 332B 332C, and 332D may be text documents. The storage device 328 stores data communicated via the first wireless transceiver 318, the second wireless transceiver 320, the first Ethernet port 324, and the second Ethernet port 326 into the files 332A, 332B 332C, and 332D, respectively. In particular, the storage device 328 stores each incoming data traffic unit in respective of the files 332A-332D in a first-in-first-out (FIFO) format.

In some examples, the authentication unit 330 may be coupled to the storage device 328 and may be implemented as an electronic memory device that can store cryptographic keys, such as, a decryption key of the AP 300, in a key store (KS) 336. In some examples, the decryption key may be a private key of the AP. The authentication unit 330 may be implemented using devices such as a RAM, an NVRAM, an EEPROM, a storage drive (e.g., SSD or HDD), a flash memory, and the like. In some examples, the authentication unit 330 may also include an authentication control unit (ACU) 338 implemented via a CPU, a microprocessor, a microcontroller, an FPGA, an ASIC, an IC, control logic, electronic circuits, or combinations thereof. The authentication control unit 338 is configured to communicate with a security co-processor chip 340 of the AP 300.

The security co-processor chip 340 conforms to Trusted Computing Group (TCG) specifications. In some examples, the security co-processor chip 340 may include device unique data such as a private key. The security co-processor chip 340 can use the private key for data encryption and decryption purposes. In some examples, an operating system (OS) running via the processing resource of the data processing circuit 306 of the AP 300 may ask the security co-processor chip 340 to perform cryptographic operations such as sign, decrypt, encrypt, etc. In some examples, the authentication unit 330 may be configured to receive the private key from the security co-processor chip 340. The authentication unit 330 supplies the private key to the storage device 328. Accordingly, in some examples, the storage control unit 334 may decrypt and/or decapsulate the data traffic stored in the files 332A-332D using the private key. Accordingly, in some examples, the files 332A-332D may contain decrypted and/or decapsulated data traffic.

Further, during operation, the transmitter 314 may be configured to poll the communication port 308 to detect the presence of the external device. When the external device is detected as connected to the communication port 308, the transmitter 314 may access the files 332A-332D from the storage device and transmit the files 332A-332D to the external device via the communication port 308. In particular, the storage device 328 buffers all data traffic corresponding to the specified transceiver and/or the port in the duration between the time when data capture is enabled and till the end of the capture duration. Further, in some examples, the storage device 328 may be configured to delete the content of the files 332A, 332B 332C, and 332D upon detecting a predefined event. In one example, the predefined event may be a successful transfer of the data of the files 332A, 332B 332C, and 332D to the external device. In another example, the predefined event may be an expiry of a predefined data retention period. The predefined data retention period specifies a duration for which the captured data may be retained by the storage device 328. In some examples, the data retention period may be a customizable parameter and can be adjusted by an administrator user of the AP 300.

Figure 4:
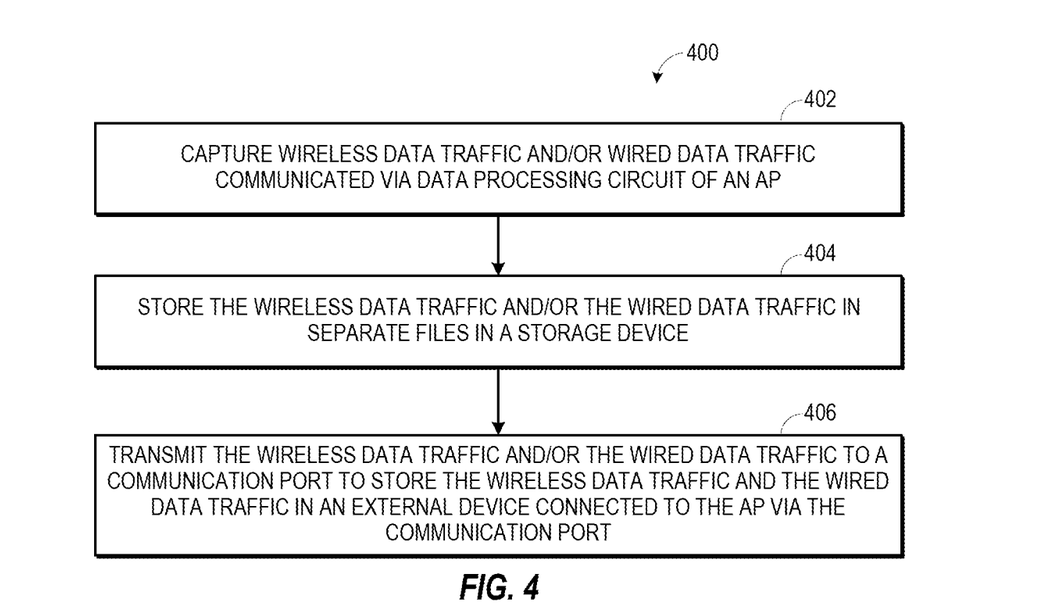
FIG. 4 depicts a flowchart of an example method for mirroring data traffic received by an AP.

FIG. 4 depicts an example method 400 for performing data traffic mirroring via an AP. The method 400 includes several steps in an order. However, the order of steps shown in FIG. 4 should not be construed as the only order for the steps. The steps may be performed at any time, in any order. Additionally, the steps may be repeated or omitted as needed. In some examples, the steps shown in FIG. 4 may be performed by any suitable device, such as an AP (e.g., the APs 102, 200, or 300 described earlier). In some examples, the suitable device may include a hardware processing resource, such as one or more central processing units (CPUs), semiconductor-based microprocessors, and/or other hardware devices suitable for retrieval and execution of instructions stored in a machine-readable storage medium to mirror data traffic communicated via the AP. In some examples, the AP may include one or more specialized electronic circuits, such as, a data mirroring circuit that include electronic components for performing the functionality of one or more instructions, such as an FPGA, ASIC, or other electronic circuits.

At step 402, the AP captures wireless data traffic and/or wired data traffic communicated by a data processing circuit of the AP. In particular, a data mirroring circuit (e.g., the data mirroring circuit 210, 310) disposed in an AP may initiate captures of the data traffic via a receiver (e.g., receiver 212, 312). In some examples, the data mirroring circuit initiates such data capture when it detects that such data capture is enabled, for example, via execution of CLI commands. Moreover, in such cases, the data mirroring circuit captures the data traffic communicated through one or more of the communication interfaces, such as, wireless transceivers and/or Ethernet ports, in accordance with parameters specified in the CLI commands (e.g., the CLI commands 1-3). Alternatively, in some examples, the data mirroring circuit be configured to continuously capture the wireless data traffic and the wired data traffic communicated through the communication interfaces of the AP.

Further, at step 404, the AP stores the wireless data traffic and/or the wired data traffic in separate files. In particular, the receiver of the data mirroring circuit in the AP sends the captured data traffic to a storage device deployed in the data mirroring circuit. The storage device creates a separate file for each of the communication interfaces and stores the received data traffic in respective files. For example, if a data traffic unit (e.g., data frame/packet) is received/transmitted by the AP via a first wireless transceiver, the data traffic unit is captured by the receiver of the data mirroring circuit and is stored in a specific text file corresponding to the first wireless transceiver in the storage device of the data mirroring circuit. Similarly, data traffic units that are transmitted/received by other communication interfaces of the AP are stored in files corresponding to the communication interfaces from which such data traffic units are transmitted/received.

Furthermore, in some examples, at step 406, the AP transmits the wireless data traffic and/or the wired data traffic to a communication port to store the wireless data traffic and the wired data traffic in an external device connected to the AP via the communication port. In particular, in some examples, the transmitter of the data mirroring circuit retrieves the wireless data traffic and/or the wired data traffic from the storage device in response to determining that the external device is connected to the communication port. In particular, the transmitter retrieves the data traffic from the storage device in FIFO order. The transmitter then transmits the retrieved data traffic to the external device via the communication port.

Figure 5:
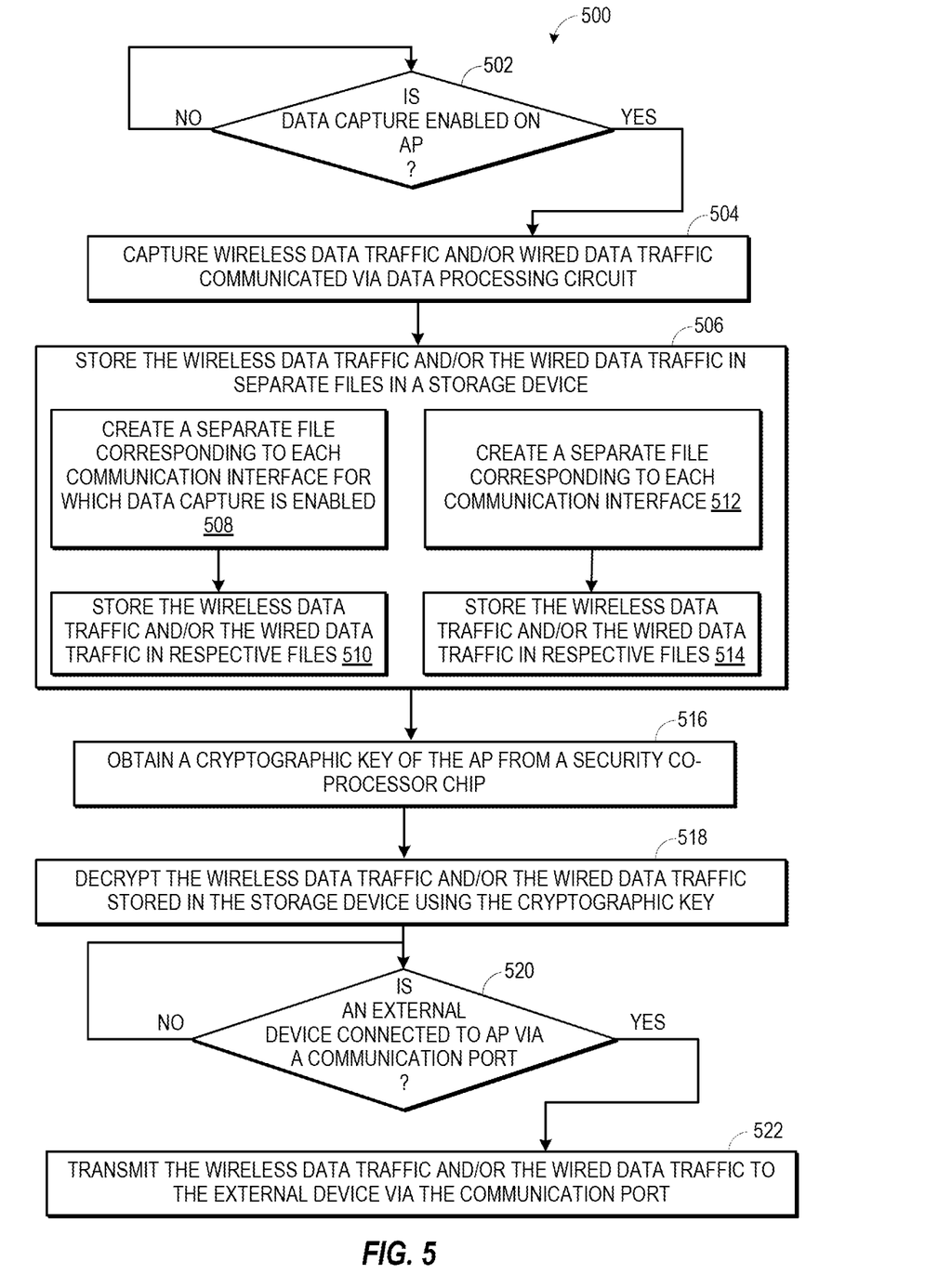
FIG. 5 depicts a flowchart of another example method for mirroring data traffic received by an AP.

Referring now to FIG. 5, a flowchart of another example method 500 for mirroring data traffic received by an AP is presented. The method 500 includes several steps in an order. However, the order of steps shown in FIG. 5 should not be construed as the only order for the steps. The steps may be performed at any time, in any order. Additionally, the steps may be repeated or omitted as needed. In some examples, the steps shown in FIG. 5 may be performed by any suitable device, such as an AP (e.g., the APs 102, 200, or 300 described earlier). In some examples, the suitable device may include a hardware processing resource, such as one or more central processing units (CPUs), semiconductor-based microprocessors, and/or other hardware devices suitable for retrieval and execution of instructions stored in a machine-readable storage medium to mirror data traffic communicated via the AP. In some examples, the AP may include one or more specialized electronic circuits, such as, a data mirroring circuit that include electronic components for performing the functionality of one or more instructions, such as an FPGA, ASIC, or other electronic circuits.

At step 502, the AP may perform a check to determine whether data capture is enabled on the AP. In particular, a receiver of a data mirroring circuit in the AP is equipped with a logic to perform such a check at step 502. In some examples, the data capture may be permanently enabled on the AP as long as the AP is operational/turned on. In some examples, the execution of data capture CLI commands, for example, the CLI commands 1-3 described earlier, causes the data mirroring circuit to start capturing the data traffic. If the data mirroring circuit detects that any such CLI command is executed, it is determined that the data capture is enabled.

At step 502, if it is determined that the data capture is not enabled, the AP continues to perform the check at step 502. However, at step 502, if it is determined that the data capture is enabled, at step 504, the AP captures wireless data traffic and/or wired data traffic communicated by its data processing circuit. In particular, a data mirroring circuit (e.g., the data mirroring circuit 210, 310) disposed in an AP may initiate captures of the data traffic via a receiver (e.g., receiver 212, 312). In particular, the data mirroring circuit captures the data traffic communicated through one or more of the communication interfaces, such as, wireless transceivers and/or Ethernet ports, in accordance with parameters specified in the CLI commands (e.g., the CLI commands 1-3). In some other examples, the data mirroring circuit may be configured to continuously capture the wireless data traffic and the wired data traffic communicated through all of the communication interfaces of the AP.

Further, at step 506, the AP stores the wireless data traffic and/or the wired data traffic into separate files. In particular, at step 506, the receiver of the data mirroring circuit in the AP sends the captured data traffic to a storage device deployed in the data mirroring circuit. Storing the data traffic in the storage device may include performing steps 508 and 510 or 512 and 514, in some examples. In particular, at step 508, the storage control unit of the storage device dynamically creates a separate file (e.g., a text document) corresponding to each communication interface for which data capture is enabled. For example, if the AP is instructed (via a CLI command) to capture wireless data traffic being communicated through a first wireless transceiver and wired data traffic being communicated through a first Ethernet port, the storage device may create a first text file (e.g., the file 332A shown in FIG. 3) corresponding to the first wireless transceiver and a second text file (e.g., the file 332C shown in FIG. 3) corresponding to the first Ethernet port. Further, at step 510, the storage device stores the wireless data traffic and the wired data traffic in respective files in first-in-first-out (FIFO) format. For example, the wireless data traffic being communicated through the first wireless transceiver may be stored in the first text file and the wired data traffic being communicated through the first Ethernet port may be stored in the second text file.

Alternatively, in some examples, at step 512, the storage device creates a separate file corresponding to each communication interface. Further, at step 514, the storage device stores the data traffic captured by the receiver in the respective files of the respective communication interface.

Furthermore, in some examples, at step 516, the data mirroring circuit obtains a cryptographic key of the AP from a security co-processor chip (e.g., TPM). In particular, the authentication unit of the data mirroring circuit receives the cryptographic key from the security co-processor chip. In certain examples, the authentication unit may be pre-configured with the cryptographic key of the AP. Moreover, at step 518, the data mirroring circuit may decrypt the wireless data traffic and/or the wired data traffic stored in the storage device using the cryptographic key before transmitting to the communication port.

Additionally, at step 520, the data mirroring circuit performs a check to determine whether an external device (e.g., an external flash drive) is connected to the AP at the communication port. In particular, the transmitter of the data mirroring circuit polls the communication port to detect the presence of the external device at the communication port. In some examples, although the step 520 is shown as being performed in series, step 520 may be executed in parallel with any other steps of the method 500. At step 520, if it is determined that no external device is connected to the communication port, the transmitter continues to poll the communication port to detect the presence of the external device. However, at step 520, if it is determined that the external device is connected to the AP at the communication port, the data mirroring circuit, at step 522, may commence the transmission of the wireless data traffic and the wired data traffic to the external device via the communication port upon detecting that. The wireless data traffic and/or the wired data traffic stored in the storage device are transmitted to the communication port to store the wireless data traffic and the wired data traffic in an external device. In particular, in some examples, the transmitter of the data mirroring circuit retrieves the wireless data traffic and/or the wired data traffic from the storage device in response to determining that the external device is connected to the communication port. In particular, the transmitter retrieves the data traffic from the storage device in FIFO order. The transmitter then transmits the retrieved data traffic to the external device via the communication port.

Figure 6:
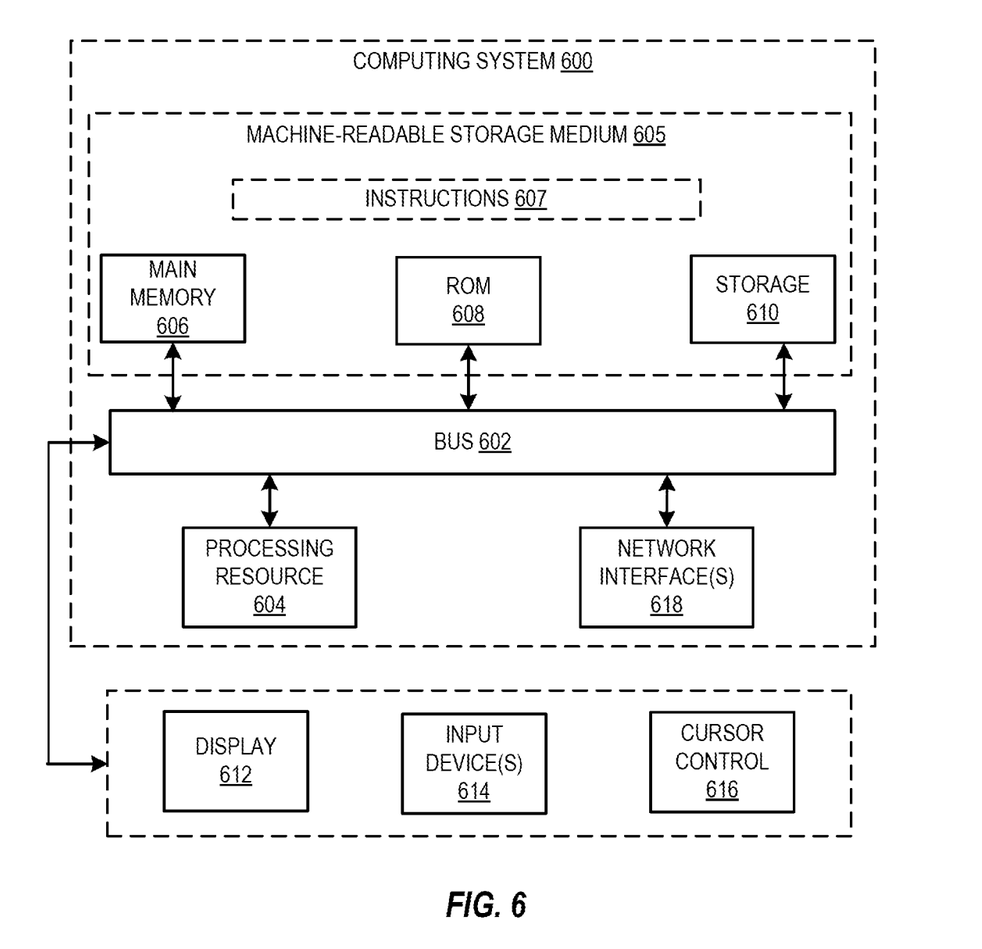
FIG. 6 depicts a block diagram of an example computing system in which various of the examples described herein may be implemented.

FIG. 6 depicts a block diagram of an example computing system 600 in which various of the examples described herein may be implemented. In some examples, the computing system 600 may be configured to operate as an AP and can perform various operations described in one or more of the earlier drawings.

The computing system 600 may include a bus 602 or other communication mechanisms for communicating information, a hardware processor, also referred to as processing resource 604, and a machine-readable storage medium 605 coupled to the bus 602 for processing information. In some examples, the processing resource 604 may include one or more CPUs, semiconductor-based microprocessors, and/or other hardware devices suitable for retrieval and execution of instructions stored in a machine-readable storage medium 605. The processing resource 604 may fetch, decode, and execute instructions, to perform data traffic mirroring. As an alternative or in addition to retrieving and executing instructions, the processing resource 604 may include one or more electronic circuits that include electronic components for performing the functionality of one or more instructions, such as an FPGA, an ASIC, or other electronic circuits.

In some examples, the machine-readable storage medium 605 may include a main memory 606, such as a RAM, cache and/or other dynamic storage devices, coupled to the bus 602 for storing information and instructions to be executed by the processing resource 604. The main memory 606 may also be used for storing temporary variables or other intermediate information during the execution of instructions to be executed by the processing resource 604. Such instructions, when stored in storage media accessible to the processing resource 604, render the computing system 600 into a special-purpose machine that is customized to perform the operations specified in the instructions. The machine-readable storage medium 605 may further include a read-only memory (ROM) 608 or other static storage device coupled to the bus 602 for storing static information and instructions for the processing resource 604. Further, in the machine-readable storage medium 605, a storage device 610, such as a magnetic disk, optical disk, or USB thumb drive (Flash drive), etc., may be provided and coupled to the bus 602 for storing information and instructions.

Further, in some implementations, the computing system 600 may be coupled, via the bus 602, to a display 612, such as a liquid crystal display (LCD) (or touch-sensitive screen), for displaying information to a computer user. In some examples, an input device 614, including alphanumeric and other keys (physical or software generated and displayed on touch-sensitive screen), may be coupled to the bus 602 for communicating information and command selections to the processing resource 604. Also, in some examples, another type of user input device may be a cursor control 616, such as a mouse, a trackball, or cursor direction keys may be connected to the bus 602. The cursor control 616 may communicate direction information and command selections to the processing resource 604 for controlling cursor movement on the display 612. In some other examples, the same direction information and command selections as cursor control may be implemented via receiving touches on a touch screen without a cursor.

In some examples, the computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

The computing system 600 also includes a network interface 618 coupled to bus 602. The network interface 618 provides a two-way data communication coupling to one or more network links that are connected to one or more local networks. For example, the network interface 618 may be an integrated services digital network (ISDN) card, cable modem, satellite modem, or a modem to provide a data communication connection to a corresponding type of telephone line. As another example, the network interface 618 may be a local area network (LAN) card or a wireless communication unit (e.g., Wi-Fi chip/module).

In some examples, the machine-readable storage medium 605 (e.g., one or more of the main memory 606, the ROM 608, or the storage device 610) stores instructions 607 which when executed by the processing resource 604 may cause the processing resource 604 to execute one or more of the methods/operations described hereinabove. The instructions 607 may be stored on any of the main memory 606, the ROM 608, or the storage device 610. In some examples, the instructions 607 may be distributed across one or more of the main memory 606, the ROM 608, or the storage device 610. In some examples, when the computing system 600 is configured to operate as an AP, the instructions 607 may include instructions which when executed by the processing resource 604 may cause the processing resource 604 to perform one or more of the methods described in FIGS. 4 and 5.

Terms and phrases used in this document, and variations thereof, unless otherwise expressly stated, should be construed as open-ended as opposed to limiting. As examples of the foregoing, the term "including" should be read as meaning "including, without limitation" or the like. The term "example" is used to provide exemplary instances of the item in the discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent. Further, the term "and/or" as used herein refers to and encompasses any and all possible combinations of the associated listed items. It will also be understood that, although the terms first, second, etc., may be used herein to describe various elements, these elements should not be limited by these terms, as these terms are only used to distinguish one element from another unless stated otherwise or the context indicates otherwise.

What is claimed is:

1. An access point, comprising:
   a wireless network interface;
   a wired network interface;
   a data processing circuit coupled to the wireless network interface and the wired network interface, wherein the data processing circuit transmits and receives a wireless data traffic via the wireless network interface and a wired data traffic via the wired network interface;
   a communication port; and
   a data mirroring circuit coupled to the wireless network interface, the wired network interface, and the communication port, wherein the data mirroring circuit comprises:
   a receiver to capture the wireless data traffic and the wired data traffic transmitted and received by the data processing circuit; and
   a transmitter to transmit the wireless data traffic and the wired data traffic captured via the receiver to the communication port to store the wireless data traffic and the wired data traffic in an external device connected to the access point via the communication port.

2. The access point of claim 1, wherein the communication port is one selected from a group comprising a Universal Serial Bus (USB) port and an RJ-45 port.

3. The access point of claim 1, wherein the communication port is a type-C USB port.

4. The access point of claim 1, wherein the data mirroring circuit comprises a storage device to store the wired data traffic and the wireless data traffic in separate files.

5. The access point of claim 4, wherein the wireless network interface comprises a plurality of wireless transceivers to communicate the wireless data traffic.

6. The access point of claim 5, wherein the wired network interface comprises a plurality of Ethernet ports to communicate the wired data traffic.

7. The access point of claim 6, wherein the storage device stores data traffic communicated via each of the plurality of wireless transceivers and the plurality of Ethernet ports in separate files.

8. The access point of claim 4, further comprising an authentication unit coupled to the storage device storing a cryptographic key to decrypt the wired data traffic and the wireless data traffic stored in the storage device.

9. The access point of claim 6, wherein the transmitter sends the decrypted wired data traffic and the decrypted wireless data traffic from the storage device to the communication port upon detecting that the external device is connected to the communication port.

10. The access point of claim 1, wherein use of the data mirroring circuit within the access point avoids need to stream any of the wired data traffic or wireless data traffic to wired network devices thereby minimizing or avoiding chances of data packets being missed or misarranged, reduces network bandwidth usage, and allows the use of unoccupied ports to connect to other network devices.

11. A method, comprising:
    capturing, by a data mirroring circuit disposed in an access point, a wireless data traffic and a wired data traffic transmitted and received via a data processing circuit of the access point;
    storing, by a data mirroring circuit, the wireless data traffic and the wired data traffic in separate files; and
    transmitting, by the data mirroring circuit, the wireless data traffic and the wired data traffic to a communication port to store the wireless data traffic and the wired data traffic in an external device connected to the access point via the communication port.

12. The method of claim 11, further comprising determining that data capture is enabled, and wherein the wireless data traffic and the wired data traffic are captured by the data mirroring circuit in response to determining that the data capture is enabled.

13. The method of claim 11, wherein storing the wireless data traffic and the wired data traffic comprises:
    creating a separate file corresponding to each communication unit for which data capture is enabled; and
    storing the wireless data traffic and the wired data traffic in respective files in first-in-first-out (FIFO) format.

14. The method of claim 11, wherein storing the wireless data traffic and the wired data traffic comprises creating a separate file corresponding to each communication unit of the access point.

15. The method of claim 11, further comprising obtaining, by the data mirroring circuit, a cryptographic key from a security co-processor chip of the access point.

16. The method of claim 15, further comprising decrypting, by the data mirroring circuit, the wireless data traffic and the wired data traffic using the cryptographic key before transmitting to the communication port.

17. The method of claim 11, further comprising:
detecting, by the data mirroring circuit, that the external device is connected to the access point at the communication port; and
commencing, by the data mirroring circuit, transmission of the wireless data traffic and the wired data traffic to the external device via the communication port upon detecting that the external device is connected to the access point.

18. A system comprising
an access point comprising a Type-C USB port;
a first client device connected to the access point;
a second client device connected to the access point; and
an external storage device connected to the access point via the Type-C USB port;
wherein the access point comprises:
   a wireless network interface;
   a wired network interface;
   a data processing circuit coupled to the wireless network interface and the wired network interface, wherein the data processing circuit communicates a wireless data traffic via the wireless network interface with the first client device and a wired data traffic via the wired network interface with the second client device; and
   a data mirroring circuit coupled to the wireless network interface, the wired network interface, and the Type-C USB port, wherein the data mirroring circuit comprises:
      a receiver to capture the wireless data traffic and the wired data traffic transmitted and received by the data processing circuit; and
      a transmitter to transmit the wireless data traffic and the wired data traffic captured via the receiver to the Type-C USB port to store the wireless data traffic and the wired data traffic in the external storage device.

19. The system of claim 18, wherein the data mirroring circuit further comprises:
a storage device to store the wired data traffic and the wireless data traffic in separate files; and
an authentication unit coupled to the storage device storing a cryptographic key to decrypt the wired data traffic and the wireless data traffic stored in the storage device.

20. The system of claim 19, wherein the files comprise a file corresponding to each communication unit of the wireless network interface and the wired wireless network interface.

* * * * *